US012704812B2

(12) United States Patent
Bravo et al.

(10) Patent No.: US 12,704,812 B2
(45) Date of Patent: Aug. 11, 2026

(54) DEVICE FOR AUTONOMOUS ADJUSTMENT OF THE ACTIVE LENGTH OF A BALANCE SPRING

(71) Applicant: The Swatch Group Research and Development Ltd, Marin (CH)

(72) Inventors: Paulo Bravo, Marin-Epagnier (CH); Andres Cabezas Jurin, Yverdon-les-Bains (CH)

(73) Assignee: The Swatch Group Research and Development Ltd, Marin (CH)

( * ) Notice: Subject to any disclaimer, the term of this patent is extended or adjusted under 35 U.S.C. 154(b) by 292 days.

(21) Appl. No.: 18/427,050

(22) Filed: Jan. 30, 2024

(65) Prior Publication Data

US 2024/0302796 A1 Sep. 12, 2024

(30) Foreign Application Priority Data

Mar. 6, 2023 (EP) .................................... 23160134

(51) Int. Cl.
*G04B 18/04* (2006.01)

(52) U.S. Cl.
CPC .................................... *G04B 18/04* (2013.01)

(58) Field of Classification Search
CPC .... G04B 18/04; G04B 18/023; G04B 18/028; G04B 18/06; G04B 17/32; G04B 18/02
See application file for complete search history.

(56) References Cited

U.S. PATENT DOCUMENTS

| | | | | |
|---|---|---|---|---|
| 2006/0062088 A1* | 3/2006 | Hintze | ................. | G04B 18/023 368/175 |
| 2019/0187618 A1* | 6/2019 | Bravo | .................. | G04B 17/063 |
| 2022/0091562 A1* | 3/2022 | Winkler | ................. | G04B 31/02 |

FOREIGN PATENT DOCUMENTS

| | | | |
|---|---|---|---|
| EP | 2980658 B1 * | 7/2017 | ........... G04B 17/325 |
| EP | 3 502 788 A1 | 6/2019 | |
| JP | 2016133312 A * | 7/2016 | |

OTHER PUBLICATIONS

European Search Report for Application No. 23 16 0134 dated Jul. 13, 2023.

* cited by examiner

*Primary Examiner* — Edwin A. Leon
*Assistant Examiner* — Kevin Andrew Johnston
(74) *Attorney, Agent, or Firm* — Sughrue Mion, PLLC

(57) ABSTRACT

A device (6) for autonomous adjustment of the active length of a spiral (5), for a balance-spiral type oscillator (4, 5), including a cock (12) mounted on a plate (13) of a horological movement (2) and in which a balance shaft pivots, the spiral (5) including an inner end secured to the balance shaft and an outer end secured to a balance spring stud (8) fastened to a balance spring stud holder (10), the balance spring stud holder (10) being pivotably mounted on the cock (12) concentrically with the balance shaft, and means for modifying the active length of the spiral (5).

15 Claims, 3 Drawing Sheets

DEVICE FOR AUTONOMOUS ADJUSTMENT OF THE ACTIVE LENGTH OF A BALANCE SPRING

CROSS REFERENCE TO RELATED APPLICATION

This application claims priority to European Patent Application No. 23160134.5 filed Mar. 6, 2023, the entire contents of which are incorporated herein by reference.

TECHNICAL FIELD OF THE INVENTION

The invention relates to a device for autonomous adjustment of the active length of a spiral, for a balance-spiral type oscillator.

The invention also relates to a horological movement including the device for autonomous adjustment of the active length of a spiral and a balance-spiral type oscillator.

The invention also relates to a timepiece, in particular a watch, including the horological movement.

TECHNOLOGICAL BACKGROUND

In the field of watches equipped with mechanical oscillators of the balance-spiral type, mechanisms for manually adjusting the active length of the spiral are known.

For example, in common manual adjustment mechanisms, the outer end of the spiral is immobilised by a balance spring stud fastened to a balance spring stud holder secured to a cock. An index rotatably movable relative to the balance spring stud holder is provided to adjust the active length of the spiral, thereby allowing adjusting the frequency of the balance-spiral. The index is a lever, generally equipped with two arms, which pivots while being centered on the coordinate of the balance shaft. For example, a first arm of the index carries two pins between which the spiral is free. A second arm of the index can be manually operated to make the index pivot by a given angle around the balance shaft. This allows modifying the actual position of the counting point. When the index pivots, the active length of the spiral is reduced or increased. Nonetheless, a drawback of such a manual adjustment device is that Earth's gravity affects the frequency of the oscillations of the balance-spiral according to the direction of the corresponding horological movement. Thus, the running of a watch might have a considerable running deviation between its horizontal and vertical positions, in particular. Furthermore, when the spiral moves between the pins because of a clearance between these, the oscillations of the balance-spring cause a disturbance of its active length and therefore a slight variation in the frequency of the oscillations of the balance-spiral set.

In order to limit the negative effects of gravity, it is known, in particular from the patent document CH 705 605 B1, a solution implementing a device for adjusting the active length of the spiral, wherein the index carries clamping means intended to clamp a terminal portion of the spiral to define the active length of the latter. The outer end of the spiral is furthermore secured to a fastening system mounted movable relative to the index and arranged so as to cooperate with the latter. The clamping means, for example consisting of a pin-eccentric clamping system in which the terminal portion of the spiral is clamped, can be freely loosened or tightened by a watchmaker. Once the watchmaker has loosened the pin-eccentric clamping system, he can move the fastening system by means of a tool, thereby allowing moving the spiral relative to the index which remains fixed, and therefore relative to the pin, which allows modifying the active length of the spiral. The watchmaker can then clamp the spiral against the pin by tightening the clamping system, to replace the adjustment device in the service position. Nonetheless, such a solution is still a manual adjustment solution, which has the drawback of considerably limiting the accuracy of the adjustment allowing counteracting the effects of gravity. Furthermore, such a solution is tedious to implement, due to the different steps of manual adjustment by a clockmaker required for adjustment.

SUMMARY OF THE INVENTION

Hence, the invention aims to provide a device for adjusting the active length of a spiral, for a balance-spiral type oscillator, allowing counteracting the effects of gravity, in particular disturbances of the isochronism of the balance of the oscillator, in a simple, accurate and autonomous manner, and overcoming the aforementioned drawbacks of the prior art.

To this end, the invention relates to a device for autonomous adjustment of the active length of a spiral, for a balance-spiral type oscillator, comprising a cock mounted on a plate of a horological movement and in which a balance shaft pivots, the spiral including an inner end secured to the balance shaft and an outer end secured to a balance spring stud fastened to a balance spring stud holder, the balance spring stud holder being pivotably mounted on the cock concentrically to the balance shaft, and means of modifying the active length of the spiral.

According to the invention, the means for modifying the active length of the spiral comprise:

- a first arm capable of moving between a rest position and a correction position of the device, the at least one arm having a first free end and a second end cooperating with a first pair of pins mounted on the balance spring stud holder, the first pair of pins being angularly offset with respect to the balance spring stud;
- a second arm capable of moving between a rest position and a correction position of the device, the second arm having a first free end and a second end cooperating with a second pair of pins mounted on the balance spring stud holder, the second pair of pins being angularly offset with respect to the second pair of pins and the balance spring stud;
- elastic biasing means configured to exert an elastic action on each arm for returning it in position;
- two inertia blocks, each movable in translation in orthogonal planes, the inertia blocks being arranged to move in translation according to gravity, the movement of at least one of the inertia blocks driving in rotation a shaft on which a first cam is mounted, the rotation of the first cam causing a movement of the arm, and a second cam arranged so as to cooperate with the second arm and move it in translation, to act on the spiral and simultaneously modifying the active length of the spiral;
- elastic return means configured to exert an elastic action on the inertia blocks for returning them in position.

According to other advantageous alternative embodiments of the invention:

- each inertia block comprises a toothed sector arranged to cooperate with a pinion secured to the axis;
- the elastic return means are in the form of a pair of spring leaves arranged at each of the ends of each inertia block;
- the cams are radial cams with an external profile;

- the cams are angularly offset with respect to one another;
- in the rest position of the device, a planar portion of each cam is in contact with an arm, and, in the correction position of the device, a wedge or an angle of the cam is in contact with one of the arms;
- the cams are in permanent contact with the free end of each arm regardless of the position of the inertia block;
- the free end of the first arm comprises elastically-deformable adjustment means, the adjustment means being in the form of a spring leaf a first end of which is secured to the arm and a second end is free, the free end being arranged so as to be biased and adjust the length of the first arm;
- the free end of the second arm comprises elastically-deformable adjustment means, the adjustment means being in the form of a spring leaf a first end of which is secured to the arm and a second end is free, the free end being arranged so as to be biased and adjust the length of the second arm;
- the device comprises means for adjusting the elastic constraint, the adjustment means being in the form of a screw, the screw passing through the free end and bearing against the arm;
- the first pair of pins is fastened to the balance spring stud holder via a first support, the arm being arranged so that it slides between the two pins and comes into contact with the outer coil of the spiral in the correction position;
- the second pair of pins is fastened to the balance spring stud holder via a second support, the arm being arranged so that it passes between the two pins and comes into contact with the outer coil of the spiral in the correction position.

An advantage of the adjustment device according to the invention is that it comprises inertia blocks mounted movable in translation and cooperating indirectly with a movable arm arranged so as to act on the outer coil of the spiral. Thus, a movement of the inertia block, freely subjected to gravity, causes a movement of the arm, between a rest position and a correction position of the device, and simultaneously acts on the spiral to modify the active length of the spiral, allowing adjusting the latter in order to compensate for the disturbances of the isochronism of the balance due to gravity. Therefore, the adjustment device according to the invention allows accurately compensating for the running of the oscillator according to its position in space, by counteracting the disturbances of the isochronism of the balance due to gravity, and that being so autonomously.

The invention also relates to a horological movement including the above-described adjustment device, and which comprises the features mentioned in the dependent claim 14.

The invention also relates to a timepiece including the above-described horological movement, and which comprises the features mentioned in the dependent claim 15.

BRIEF DESCRIPTION OF THE FIGURES

The aims, advantages and features of the device for adjusting the active length of a spiral, as well as the horological movement and the timepiece comprising it, will appear better in the following description based on at least one non-limiting embodiment illustrated by the drawings wherein.

DETAILED DESCRIPTION OF THE INVENTION

In the following description, reference is made to a horological movement equipped with a device for adjusting the active length of a spiral, for a balance-spiral type oscillator. The usual components of the horological movement, which are well-known to a person skilled in the art in this technical field, are described only in simplified terms or not at all. Indeed, a person skilled in the art will be able to adapt these different components and make them cooperate for the operation of the horological movement. In particular, not everything regarding the escapement mechanism of the horological movement will be described hereafter, although such an escapement mechanism could advantageously cooperate with the adjustment device according to the invention.

Figure 1:
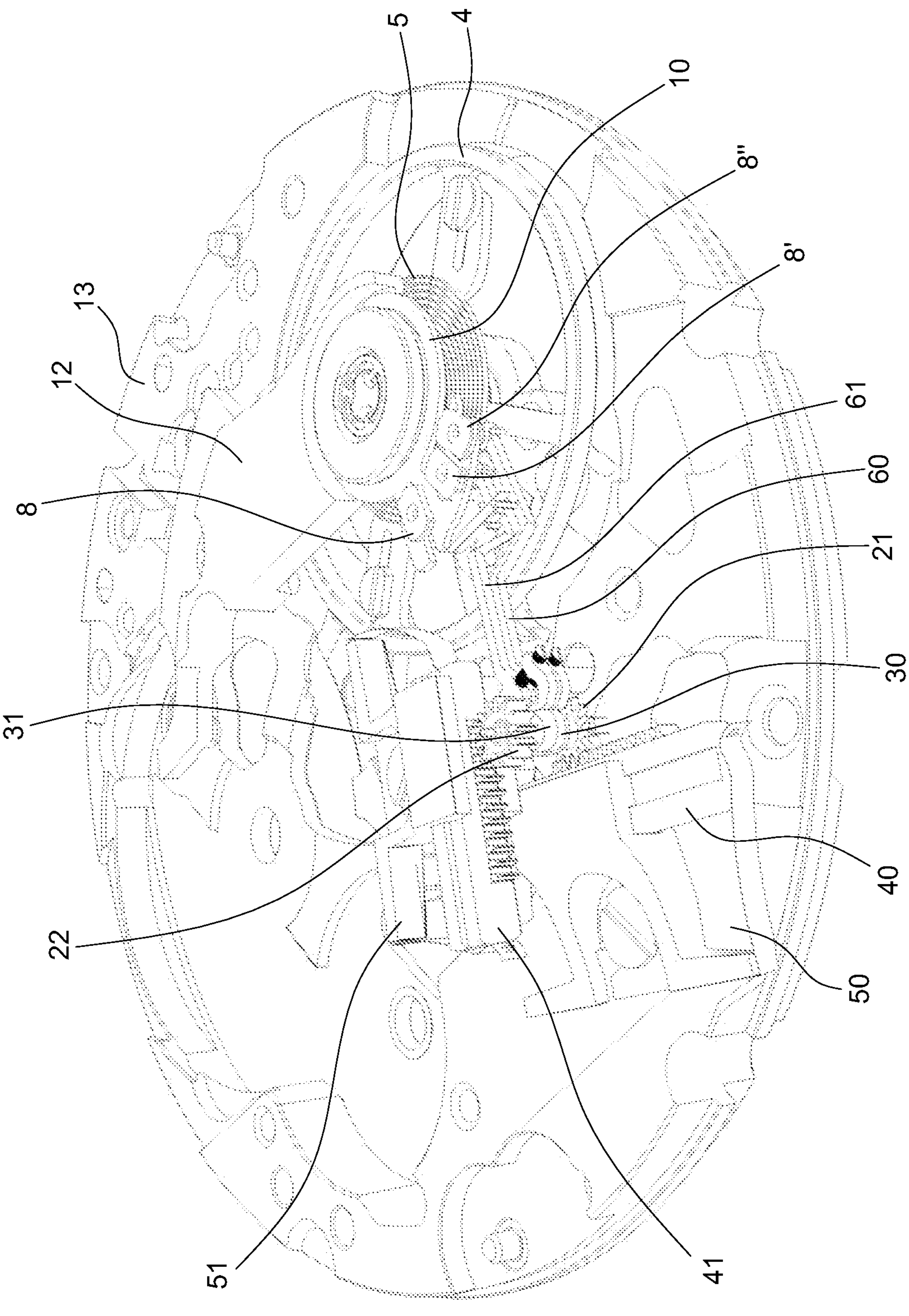
FIG. 1 is a perspective view of a horological movement of a watch comprising a device for adjusting the active length of a spiral according to the invention.
Figure 2:
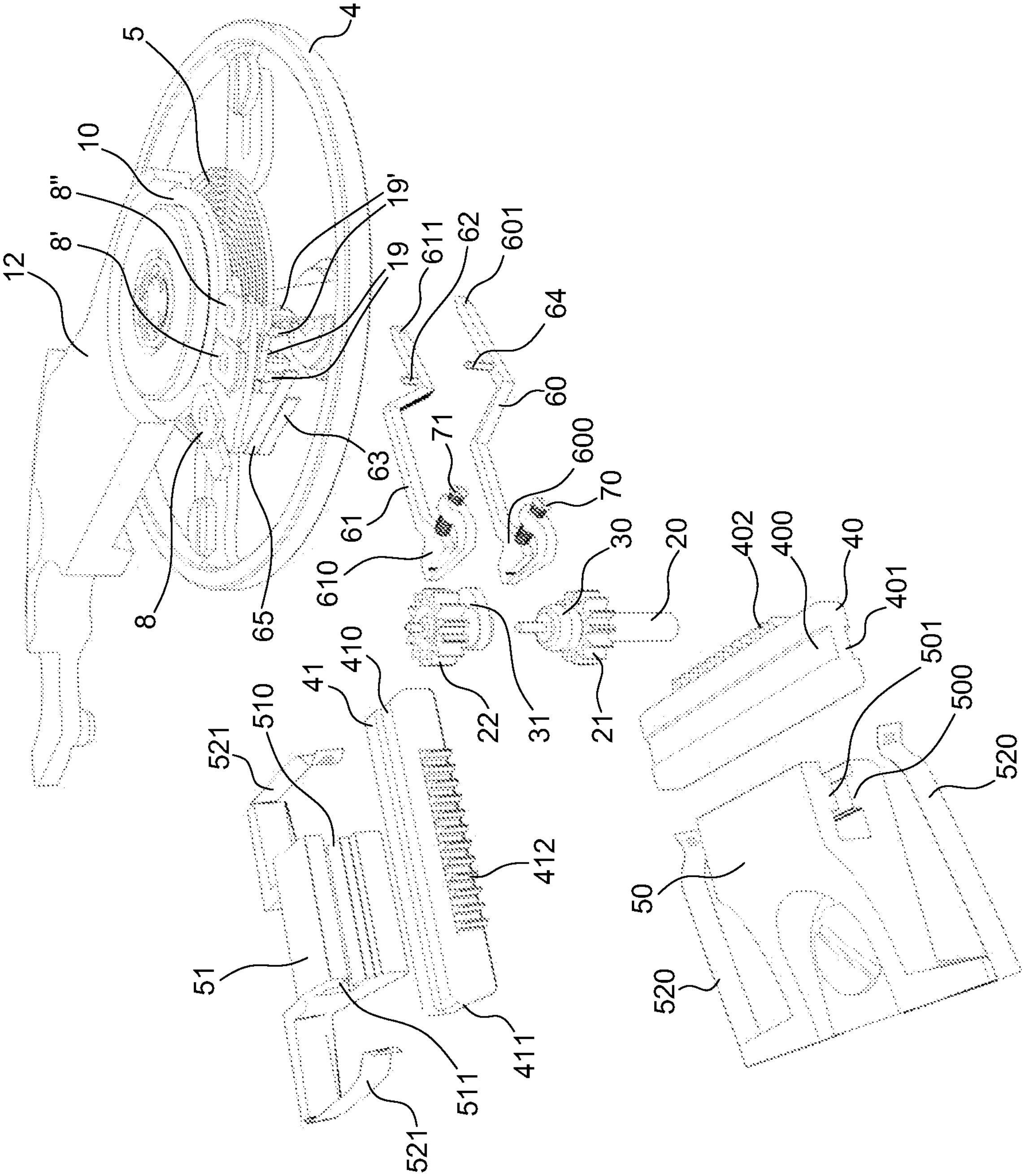
FIG. 2 an exploded perspective view of the adjustment device of FIG. 1.

FIG. 1 depicts a portion of a timepiece 1, which comprises a horological movement 2. In the particular embodiment of FIG. 1, the timepiece 1 is a watch. The horological movement 2 includes an oscillator equipped with a balance 4 and a spiral 5, and a device 6 for autonomous adjustment of the active length of the spiral 5. Conventionally, the spiral 5 is fastened to a balance shaft (not visible) by its inner end (not visible). The balance shaft has one end pivotably mounted in a balance bridge (the latter is not visible in the figures for more clarity). The outer end of the spiral 5 is conventionally fastened to a balance spring stud 8 fastened to a balance spring stud holder 10, the balance spring stud holder 10 being secured to a cock 12 by slight tightening. More specifically, the balance spring stud holder 10 is pivotably mounted on the cock 12 concentrically with the balance shaft, as illustrated in FIG. 2. The balance shaft is pivotably mounted in the cock 12.

The means 6 for modifying the active length of the spiral 5 are capable of modifying the active length of the spiral 5 by acting on the length of the outer coil of the spiral 5.

In a particular embodiment illustrated in FIG. 2, the means for modifying the active length of the spiral 5 include a first arm 60 capable of moving between a rest position and a correction position of the device, the first arm 60 having a first free end 600 and a second end 601 cooperating with a first pair of pins 19 forming a guiding fork for the first arm 60, the first pair of pins 19 being mounted on the balance spring stud holder 10 via a first support 8' and offset angularly relative to the stud 8. Thus, the second end 601 of the first arm 600 can slides between the first pair of pins 19 and comes into contact with the outer coil of the spiral 5 in the correction position and thus modify the active length of the spiral.

The means 6 for modifying the active length of the spiral also comprise a pair of linear inertia blocks 40, 41 movable in translation in orthogonal planes so that they are superimposed and do not come into contact during their movements. The inertia blocks 40, 41 are arranged so as to move in translation according to gravity, the movement of at least one of the inertia blocks 40, 41 driving in rotation a shaft 20 on which a first cam 30 and a second cam 31 are mounted. Thus, the rotation of the first cam 30 causes a movement of the first arm 60 so as to act on the spiral and simultaneously modify the active length of the spiral 5, and the same is true for the second cam 31 which is arranged so as to cooperate with the second arm 61.

As can be observed in FIG. 2, each of the inertia blocks 40, 41 is in the form of a linear body having two guide grooves 400, 401, 410, 411 extending over the length of each inertia block and arranged on opposite faces of each inertia block. The inertia blocks are arranged so as to slide each in a guide element 50, 51, each guide element comprising rails arranged so as to cooperate with the guide grooves 400, 401, 410, 411 and guide the inertia blocks in translation.

The guide elements 50, 51 are secured to the plate 13 of the movement and comprise elastic return means configured to exert an elastic action on the inertia blocks 40, 41 for returning them in position. These elastic return means are in the form of a pair of spring blades 520, 521, arranged at the distal ends of the guide elements 50, 51 so as to clamp each inertia block 40, 41 by its ends and thus accompany the movements of each inertia block then return them to their original position when the watch returns to a rest position (i.e. a position where the inertia blocks are not freely subjected to gravity).

The spring leaves 520, 521 also form damping means and allow avoiding a sudden movement of the inertia blocks 40, 41, and therefore limiting, and even preventing, a modification in the active length of the spiral 5 upon a sudden acceleration or deceleration.

The adjustment device also comprises a second arm 61 capable of moving between a rest position and a correction position of the device, the second arm 61 having a first free end 610 and a second end cooperating with a second pair of pins 19' forming a guiding fork for the second arm, the second pair of pins 19' being mounted on the stud-holder 10 via a second support 8" and offset angularly relative to the first pair of pins 19 and the stud 8. Thus, the second end 610 of the second arm 61 can slides between the second pair of pins 19' and comes into contact with the outer coil of the spiral in the correction position.

The meshing means also comprise a second cam 31 arranged so as to cooperate with the second arm whose free end 610 rests against the second cam 32.

The adjustment device comprises elastic biasing means configured to exert an elastic action on the arms 60, 61 for returning them in position. The elastic biasing means are in the form of a rod 62 secured to the arm 60 and a spring leaf 63 secured to the balance spring stud holder 10, the spring leaf 61 exerting a return force on the rod 62 and exerting an elastic action on the arm 60 for returning it in position. Elastic constraint means are also associated with the second arm 61, and comprise a rod 64 secured to the second arm 61 and a spring leaf 65 secured to the balance spring stud holder 10, the spring leaf 65 exerting a return force on the rod 64 and exerting an elastic action on the second arm 61 for returning it in position.

The adjustment device 6 also comprises means for adjusting the arms 60, 61, the free end 600, 610 of the first and second arms 60, 61 comprising elastically-deformable means for adjusting the length of the arms. The adjustment means are in the form of a spring leaf whose first end is secured to the arm and another end is free, the free end being arranged so as to be biased and adjust the length of the arms 60, 61, the spring leaf forming a space between it and the free end of each arm. Such an adjustment is necessary according to the position of the spiral and the correction to be made thereon.

In addition, each arm 60, 61 comprises means for adjusting the elastic constraint, the adjustment means being in the form of a screw, the screw 70, 71 passing through the free end of the spring leaf and bearing against the arm. Thus, when the screw is screwed, the free end of the leaf moves away and the distance between the leaf and the free end 600, 610 of the arms 60, 61 increases, which allows increasing the length of the arms 60, 61. And vice versa, when the screw is unscrewed, the free end of the leaf gets closer and the distance between the leaf and the free end 600, 610 of the arms 60, 61 decreases, which allows increasing the length of the arms 60, 61.

According to a preferred embodiment, the inertia blocks 40, 41 are free to move in translation, each in their plane, and within the travel limit imposed by the spring leaves 520, 521. Each inertia block 40, 41 comprises a toothed sector 402, 412 which is arranged so as to mesh with a respective pinion 21, 22 of the axis 20 on which the cams 30 and 31 are mounted so that a movement of at least one of the inertia blocks 40, 41 causes a movement of at least one of the arms 60, 61 and simultaneously acts on the means for modifying the active length of the spiral 5. The movement of the arms under the effect of the movement of the inertia blocks 40, 41 subjected to gravity, is performed between a rest position of the device, and a correction position of the device, each of the arms enabling a distinct correction according to the position of the clock.

Thus, according to the position of the horological movement 2 in space, the inertia blocks 40, 41 freely subjected to gravity, can move in their plane and cause a movement of the arms 60, 61. The movement of the inertia blocks 40, 41 allows simultaneously acting on the means for modifying the active length of the spiral 5, and thus continuously adjusting the active length of the spiral in order to compensate for the disturbances of the isochronism of the balance due to gravity.

In the preferred embodiment according to which the device 6 comprises two cams 30, 31 for driving the arms 60, 61, the cams are secured to the shaft 20 and each is respectively in contact with the free end 600, 610 of the arms 60, 61. The position of the cams relative to each other is variable according to the correction to be made on the spiral, the cams could be angularly offset with respect to one another, just as they can be in the same position.

Figure 3:
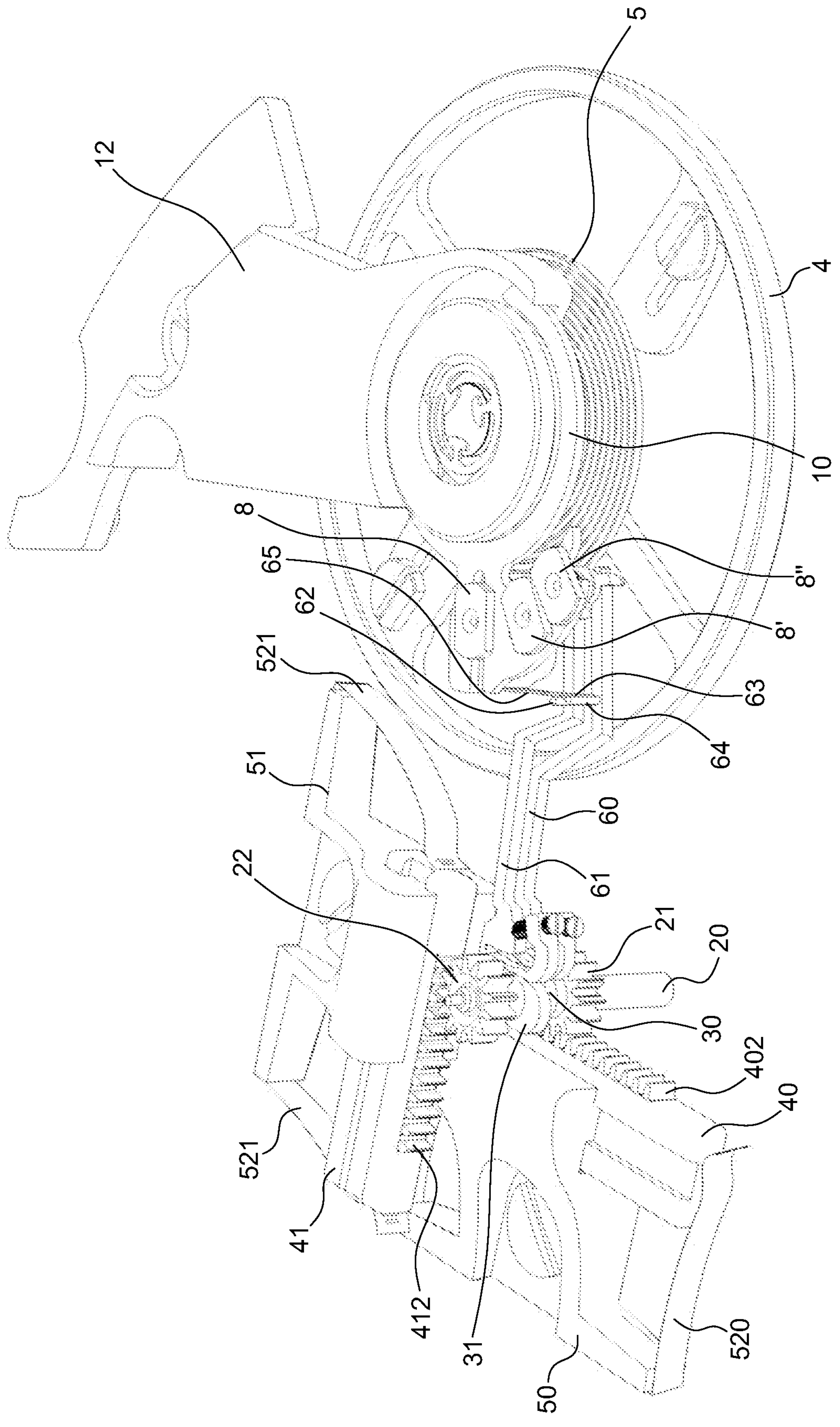
FIG. 3 shows a top view of the adjustment device of FIG. 1.

Preferably, each cam 30, 31 is a radial cam with an external profile. Although radial cams with a substantially rectangular external profile are shown in FIGS. 1 to 3, in practice the shape considered for the external profile of each cam will depend on the used type of spiral 5 and the correction to be made thereon. For example, a radial cam with a triangular, oblong or oval external profile may also be used in the context of the present invention. Preferably, and as shown in FIGS. 3 and 4, in the rest position of the adjustment device 6, a planar portion of each cam is in contact with an arm 60, 61, whereas in the correction position of the device 6, a wedge or an angle of the cam 30, 31 is in contact with the arm 60, 61. Still preferably, as visible in FIGS. 1, 3 and 4, each cam 30, 31 is in contact with its respective arm regardless of the position of the inertia block 40.

Thus, it should be understood that, according to the position of the horological movement 2 in space, the inertia blocks 40, 41 freely subjected to gravity, can slide in their plane and cause a movement of the arms 60, 61. In doing so, the movement of the inertia blocks allows acting simultaneously on the means for modifying the active length of the spiral 5, allowing continuously adjusting the active length of the spiral in order to compensate for the disturbances of the isochronism of the balance due to gravity.

The movement of the inertia blocks 40, 41 causes a rotation of the shaft 20 through the cooperation of the toothed sectors 402, 412 with the pinions 20, 21 of the shaft 20 and has the effect of driving the cams 30, 31 which are secured to the shaft, the cams then acting on the free end 600, 610 of the arms 60, 61 and moving at least one of the arms 60, 61 so that the second end of one of the arms comes into contact with the spiral 5 so as to modify the active length of the spiral 5.

Once the inertia block has been stabilised upon change of its position, the device will automatically return to the rest position thanks to the action of the spring leaves 520, 521 on the inertia blocks 40, 41.

The invention also relates to a horological movement 2 including a balance-spiral type oscillator 4, 5 and a device 6 for independent adjustment of the active length of the spiral 5 as described before.

The invention also relates to a timepiece 1 including a horological movement 2 equipped with a device 6 for autonomous adjustment of the active length of the spiral 5 as described before.

The invention claimed is:

1. A device for independent adjustment of the active length of a spiral, for a balance-spiral type oscillator, comprising a cock mounted on a plate of a horological movement and in which a balance shaft pivots, the spiral including an inner end secured to the balance shaft and an outer end secured to a balance spring stud fastened to a balance spring stud holder, the balance spring stud holder being pivotably mounted on the cock concentrically with the balance shaft, and means for modifying the active length of the spiral, wherein the means for modifying the active length of the spiral comprise:

a first arm capable of moving between a rest position and a correction position of the device, the at least one arm having a first free end and a second end cooperating with a first pair of pins mounted on the balance spring stud holder, the first pair of pins being angularly offset relative to the stud;

a second arm capable of moving between the rest position and the correction position of the device, the second arm having a first free end and a second end cooperating with a second pair of pins mounted on the balance spring stud holder, the second pair of pins being angularly offset relative to the first pair of pins and to the stud;

elastic biasing means configured to exert an elastic action on the arms for returning them in position;

two inertia blocks, each movable in translation in orthogonal planes, the inertia blocks being arranged to move in translation according to gravity, the movement of at least one of the inertia blocks causing a rotation of a shaft on which a first cam is mounted, the rotation of the first cam causing a movement of the arm and a second cam arranged so as to cooperate with the second arm and move it in translation, to act on the spiral and simultaneously modify the active length of the spiral; and elastic return means configured to exert an elastic action on the inertia blocks for returning them in position.

2. The device for autonomous adjustment of the active length of a spiral according to claim 1, wherein each inertia block comprises a toothed sector arranged to cooperate with a pinion secured to the axis.

3. The device for autonomous adjustment of the active length of a coil according to claim 2, wherein the elastic return means are in the form of a pair of spring leaves arranged at each end of each inertia block.

4. The device for autonomous adjustment of the active length of a spiral according to claim 1, wherein the cams are radial cams with an external profile.

5. The device for autonomous adjustment of the active length of a spiral according to claim 1, wherein the cams are angularly offset with respect to one another.

6. The device for autonomous adjustment of the active length of a spiral according to claim 1, wherein, in the rest position of the device, a planar portion of each cam is in contact with one of the arms, and, in the correction position of the device, a wedge or an angle of the cam is in contact with one of the arms.

7. The device for independent adjustment of the active length of a spiral according to claim 1, wherein the cams are in permanent contact with the free end of each arm regardless of the position of the inertia block.

8. The device for autonomous adjustment of the active length of a spiral according to claim 1, wherein the free end of the first arm comprises elastically-deformable adjustment means in the form of a spring leaf whose first end is secured to the arm and another end is free, the free end being arranged so as to be biased and adjust the length of the first arm.

9. The device for autonomous adjustment of the active length of a spiral according to claim 1, wherein the free end of the second arm comprises elastically deformable adjustment means in the form of a spring leaf whose first end is secured to the arm and another end is free, the free end being arranged so as to be biased and adjust the length of the second arm.

10. The device for autonomous adjustment of the active length of a spiral according to claim 8, further comprising means for adjusting the elastic stress in the form of a screw, the screw passing through the free end and bearing against the arm.

11. The device for autonomous adjustment of the active length of a spiral according to claim 1, wherein the first pair of pins is fastened to the balance spring stud holder via a first support, the arm being arranged so that it slides between the first pair of pins and the second pair of pins and comes into contact with the outer coil of the spiral in the correction position.

12. The device for autonomous adjustment of the active length of a spiral according to claim 1, wherein the second pair of pins is fastened to the balance spring stud holder via a second support, the arm being arranged so that it passes between the first pair of pins and the second pair of pins and comes into contact with the outer coil of the spiral in the correction position.

13. The device for autonomous adjustment of the active length of a spiral according to claim 1, wherein the inertia blocks have a parallelepipedic shape.

14. A horological movement including a balance-spiral type oscillator and the device for autonomous adjustment of the active length of the spiral according to claim 1.

15. A timepiece including the horological movement in accordance with claim 14.

* * * * *